United States Patent Office 3,537,756
Patented Nov. 3, 1970

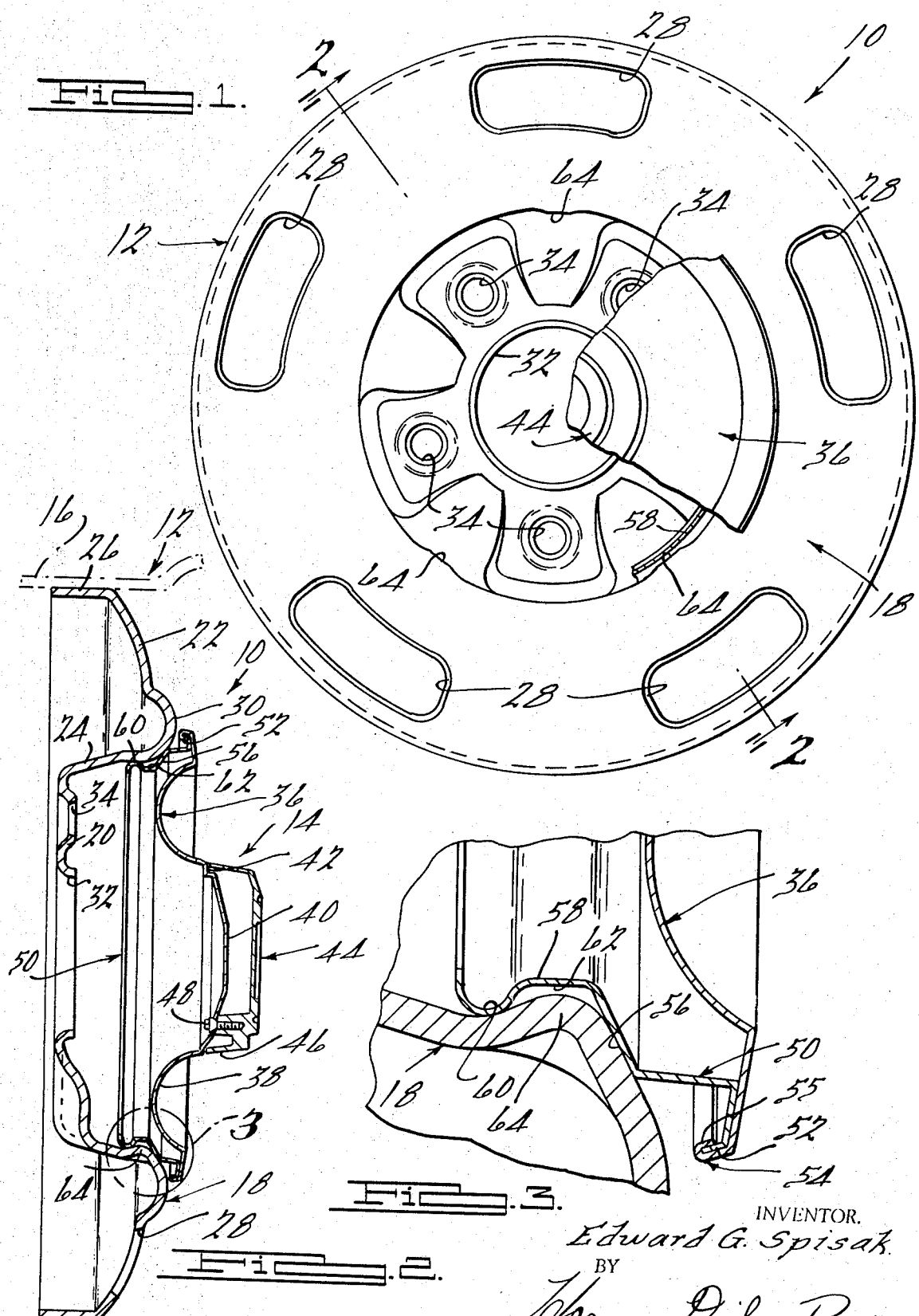

3,537,756
COMBINATION WHEEL AND HUBCAP ASSEMBLY
Edward G. Spisak, Wayne, Mich., assignor to Gar Wood Industries, Inc., Wayne, Mich., a corporation of Michigan
Filed June 5, 1968, Ser. No. 734,748
Int. Cl. B60b 7/00
U.S. Cl. 301—108                                    1 Claim

ABSTRACT OF THE DISCLOSURE

A combination vehicle wheel and hubcap assembly comprising a vehicle wheel having a generally circular shaped, radially disposed spider member and an annular wheel rim extending therearound; the spider member having a central mounting section, a peripheral section spaced radially outwardly from the mounting section and an axially extending intermediate shoulder portion disposed radially between the mounting and peripheral sections; a hubcap assembly adapted to be mounted over the mounting section of the spider member; and means for detachably securing the hubcap assembly to the spider member including an annular hubcap attaching ring member adapted to be disposed radially inwardly from the shoulder portion of the spider member and a plurality of circumferentially spaced projections extending radially outwardly from the spider member and frictionally engaged with an annular recessed portion on the ring member.

BACKGROUND OF THE INVENTION

Although it has heretofore been the practice to provide wheel covers on vehicle wheels which substantially cover the entire wheel spiders, the increasingly popular use of disc-type braking systems on automotive vehicles has resulted in the need for altering the construction and design of such decorative wheel covers in order to provide for convenient mounting of the wheel covers and adequate brake cooling. In particular, it has been found that the provision of a plurality of circumferentially spaced vent openings or apertures in the wheel spiders permits air to freely circulate through the wheels and thereby enhance the cooling of the disc brakes, with the result that full size wheel covers of the aforementioned type cannot, as practical matter, be used on the vehicle wheels since they would impair, if not totally eliminate, the circulation of air through the vent openings provided in the wheel spider.

The present invention is directed toward a new and improved vehicle wheel assembly which comprises a vehicle wheel having a generally radially disposed spider member provided with a plurality of circumferentially spaced vent openings in an outer peripheral section thereof. The wheel spider also comprises a central mounting section and a generally axially inwardly extending intermediate shoulder section which is radially disposed between the mounting section and a plurality of vent openings. The wheel assembly is adapted to have an associated hubcap assembly detachably secured thereto, the hubcap assembly including a retaining or attaching ring member adapted to be received radially inwardly from the shoulder section of the wheel spider. A plurality of radially extending projections are formed around the shoulder section and are adapted to frictionally engage the hubcap attaching ring in a manner so as to positively prevent any relative indexing movement therebetween, such anti-indexing being accomplished due to a novel arrangement of the aforesaid projections around the shoulder section. By virtue of the fact that the hubcap assembly is disposed radially inwardly from the vent openings, adequate aid circulation is provided through said openings to provide for efficient brake cooling without impairment by the hubcap assembly.

SUMMARY OF THE INVENTION

This invention relates generally to vehicle wheels and associated wheels cover and, more particularly, to a combination wheel and hubcap assembly incorporating a new and improved means for positively securing the hubcap assembly on the wheel.

It is accordingly a general object of the present invention to provide a new and improved combination wheel and hubcap assembly.

It is more particular object of the present invention to provide a combination wheel and hubcap assembly of the above character which incorporates a novel means for detachably securing the hubcap assembly to the wheel.

It is yet another object of the present invention to provide a new and improved combination wheel and hubcap assembly which comprises a hubcap attaching ring member on the hubcap assembly that is adapted to be detachably secured to the associated wheel spider by means of a plurality of radially inwardly extending projections formed on an intermediate shoulder section of the wheel.

It is a related object of the present invention to provide a new and improved combination wheel and hubcap assembly of the aforedescribed type wherein the inwardly extending projections are unequally circumferentially spaced around the wheel spider, whereby to provide for positive anti-indexing of the hubcap assembly relative to the wheel.

It is a further object of the present invention to provide a new and improved combination wheel and hubcap assembly of the above character which is particularly adapted for operative association with disc-type braking systems.

It is an other object of the present invention to provide a wheel and hubcap assembly of the above character which is of an extremely simple design, is economical to commercially manufacture and will have a long and durable operational life.

Other objects and advantages of the present invention will become apparent from the following detailed description taken in conjunction with the accompanying drawing.

BRIEF DESCRIPTION OF THE DRAWING

FIG. 1 is a side elevational view, partially broken away, of the combination wheel and hubcap assembly of the present invention;

FIG. 2 is a transverse cross sectional view taken substantially along the line 2—2 of FIG. 1; and FIG. 3 is an enlarged fragmentary view of a portion of the wheel and hubcap assembly illustrated in FIG 2, as taken within the circle 3 thereof.

DETAILED DESCRIPTION OF A PREFERRED EMBODIMENT

For convenience of description, the terms "axially inner," "axially outer" and words of similar import will have reference to the wheel and hubcap assembly of the present invention hereinafter described in detail, with the axially outer side of the subject assembly being at the right side of FIG. 2. Likewise, the terms "radially inner," "radially outer" and derivatives thereof will have reference to the geometric center of the wheel and hubcap assembly of the present invention and the various component parts thereof.

Referring now to the drawing, a combination wheel and hubcap assembly 10, in accordance with a preferred embodiment of the present invention, is shown as comprising a vehicle wheel 12 and a hubcap assembly 14 detachably secured to the axially outer side thereof. The wheel 12 comprises a conventional tire supporting annular rim member, a portion of which is illustrated in FIG. 2 in phantom lines and designated by the numeral 16, and a radially disposed spider member, generally designated 18. Generally speaking, the spider member comprises a central mounting section 20, an outer peripheral section 22, and an intermediate shoulder section 24 which lies in a generally frusto-conical plane and is disposed radially between the mounting section 20 and peripheral section 22.

As best seen in FIGS. 1 and 2, the outer peripheral section 22 of the spider member 18 is formed with an axially inwardly extending flange portion 26 adapted to be fixedly secured, as by spot welding or the like, to the radially inner side of the wheel rim 16, as is well known in the art. Spaced radially inwardly from the flange portion 26 is a plurality of circumferentially spaced vent openings, generally designated 28, which are adapted to permit the circulation of cooling air through the wheel 12 so as to provide for proper cooling, for example, for an associated disc braking system. It will be apparent, of course, that the openings 28 may be provided in the spider member 18 merely for purposes of appearance, or for various other functional or manufacturing purposes, and that such openings do not necessarily have to function for circulating air to a disc or other type braking system associated with the assembly 10.

Disposed radially between the outer peripheral section 22 and the shoulder section 24 of the spider member 18 is an axially outwardly projecting, arcuately shaped portion 30 which is adapted to have a portion of the hubcap assembly 14 positively engaged therewith upon mounting said assembly 14 on the wheel 12, as will later be described. As shown in FIG. 2, the shoulder section 24 of the spider member 18 is inclined axially and radially inwardly and terminates at its axially innermost part in the mounting section 20 of the spider member 18, which section 20 is formed with a central annular opening 32 adapted to receive a portion of the associated wheel axle (not shown), and with a plurality of circumferentially spaced stud receiving openings 34 through which the associated wheel studs (not shown) extend for securing the wheel 12 to the associated wheel axle, as is well known in the art.

Referring now in detail to the construction of the hubcap assembly 14, as best seen in FIG. 2, said assembly 14 comprises a generally radially extending hubcap member 36 which is formed, by way of example, with an annular recessed area 38 and with a central axially outwardly projecting portion 40 having an annular shoulder 42 extending circumferentially therearound. For purposes of decorative appearance, the assembly 14 may be provided with a central hub member 44 having an annular side wall portion 46 adapted to have the axially innermost edge thereof engaged with the shoulder portion 42, with the central hub member 44 being fixedly secured to the hubcap member 36 by means of a plurality of suitable mounting screws, bolts or the like, one of which is shown herein and designated by the numeral 48.

The hubcap assembly 14 also comprises an annular retaining or attaching ring member, generally designated 50, which is disposed axially inwardly from the hubcap member 36 and has a radially outwardly extending peripheral flange portion 52 adapted to be crimpingly secured by means of a suitable rolled joint, as seen at 54, to an outer peripheral U-shaped portion 55 of the hubcap member 36, as best seen in FIG. 3. The hubcap attaching ring member 50 comprises an annular radially and axially inwardly extending face portion 56 which is spaced axially and radially inwardly from the rolled joint 54 and terminates at its radially innermost part in an axially extending portion 58. The axially radially innermost part of the ring portion 58 is formed with a radially outwardly projecting, arcuate-sectioned boss portion 60 which, together with the ring portions 56 and 58, defines an annular recess 62 that extends around the ring member 50 and functions in a manner hereinafter described in detachably securing the hubcap assembly 14 to the wheel spider member 18.

In accordance with the principles of the present invention, the wheel spider member 18 is provided with a plurality of radially inwardly extending, circumferentially spaced projections, generally designated 64, which, upon mounting the hubcap assembly 14 on the wheel 12, are adapted to be received within the annular recess 62 defined by the hubcap attaching ring member 50. More particularly and as best seen in FIGS. 1 and 3, the projections 64 are provided by deforming three unequally circumferentially spaced portions of the intermediate shoulder section 24 of the spider member 18, whereby the projections 64 extend radially inwardly from the frusto-conical plane of the shoulder section 24.

The hubcap attaching ring member 50 and shoulder section 24 of the spider member 18 are dimensioned such that when the hubcap assembly 14 is coaxially aligned with the wheel 12, an axially inwardly directed force against the hubcap assembly 16 will result in the boss portion of the hubcap attaching ring 50 being deformed slightly, whereby the boss portion 60 will "snap" onto or over the projections 64 and be fixedly retained on the wheel 12 by virtue of the fact that the ring member 50 is maintained under a state of compression by the projections 64. It will be seen in FIG. 3 that when the projections 64 are operatively received within the recess 62, the face portion 56 of the ring member 50 "bottoms" or firmly engages the axially outer side of the wheel portion 40, whereby to assure against any relative axial movement of the hubcap assembly 14 with respect to the wheel 12. An important feature of the present invention resides in the fact that the projections 64 are unequally circumferentially spaced around the shoulder section 24 which results in the ring member 50 being unequally deflected radially inwardly around the circumference thereof by means of the projections 64. Such an unequal deflection of the ring member 50 has been found to assure for positive gripping action between the projections 64 and the ring member 50, thereby assuring against any indexing movement of the hubcap assembly 14 with respect to the wheel 12.

In operation, the assembly 10 of the present invention will find particularly useful application in operative association with a vehicle incorporating a disc-type braking system by virtue of the fact that the openings 28 will function to circulate cooling air to the disc brake units associated with each of the vehicle wheels. Moreover, it will be noted that in typical disc brake applications, the wheel spider of the associated vehicle wheel is frequently located further axially outwardly relative to the wheel rim than in the case when normal braking systems are used, and hence conventional wheel covers which are secured directly to the wheel rims cannot be used since they would interfere to some extent with the wheel spiders. Thus, the present invention permits the assembly 14 to be secured directly to the wheel spider instead of the wheel rim, with the result that the aforementioned mounting problem is effectively circumvented.

While it will be apparent that the preferred embodiment illustrated herein is well calculated to fulfill the objects above stated, it will be appreciated that the present invention is susceptible to modification, variation and change without departing from the proper scope or fair meaning of the subjoined claim.

What is claimed is:

1. In combination in a vehicle wheel assembly, a generally circular shaped, radially disposed spider member having an annular wheel rim extending therearound,
 said spider member having a central mounting section, a peripheral section spaced radially outwardly from said mounting section and an axially extending intermediate shoulder portion disposed radially between said mounting and peripheral sections, the portion of said spider member radially outwardly from said shoulder portion defining a radially and axially outwardly directed surface, a hubcap assembly including a hubcap member adapted to be mounted over said mounting section of said spider member, said hubcap member including an outer peripheral portion, a central axially outwardly projecting portion and an annular axially inwardly dished portion between said central portion and said peripheral portion, means for detachably securing said hubcap assembly to said spider member including an annular hubcap attaching ring member adapted to be disposed radially inwardly from said shoulder portion and a plurality of unequally circumferentially spaced projections extending radially inwardly from said spider member, said peripheral section of said spider member being provided with a plurality of circumferentially spaced apertures located radially outwardly from the outer periphery of said ring and radially inwardly from said peripheral section of said spider member and extending radially a substantial distance therebetween, whereby said hubcap assembly does not impair the free circulation of air through said apertures, said ring member of said hubcap assembly comprising a generally radially and axially inwardly inclined face portion, a radially outwardly projecting boss portion, an annular recessed portion defined between said face and boss portions, and an annular securing portion extending axially outwardly from said face portion and connected to said peripheral portion of said hubcap member, said dished portion extending axially inwardly to a position substantially radially aligned with said ring face portion, said recessed portion being adapted to removably receive said projections for detachably securing said hubcap assembly to said spider member, whereby said face portion is substantially contiguously engaged with said spider surface and the peripheral portion of said hubcap member is spaced axially outwardly from the axially outer side of said spider member.

References Cited

UNITED STATES PATENTS

| | | |
|---|---|---|
| 2,199,890 | 5/1940 | Lyon. |
| 2,306,631 | 12/1942 | Lyon _____ 301—37 |
| 2,607,633 | 8/1952 | Lyon. |
| 2,996,337 | 8/1961 | Hurd. |
| 3,174,803 | 3/1965 | Mulhern _____ 301—37 |

FOREIGN PATENTS

| | | |
|---|---|---|
| 508,833 | 7/1939 | Great Britain. |

RICHARD J. JOHNSON, Primary Examiner